United States Patent [19]

Quist

[11] 4,410,610
[45] Oct. 18, 1983

[54] POLE BUSHING FOR BATTERIES

[75] Inventor: Kaj Quist, Oljobergsvägen, Sweden

[73] Assignee: AB Tudor, Nol, Sweden

[21] Appl. No.: 190,335

[22] Filed: Sep. 24, 1980

[30] Foreign Application Priority Data

Oct. 4, 1979 [SE] Sweden ............................... 7908222

[51] Int. Cl.³ ............................................. H01M 2/00
[52] U.S. Cl. ..................................... 429/181; 429/185
[58] Field of Search ............... 429/181, 180, 182, 184, 429/185, 178

[56] References Cited

U.S. PATENT DOCUMENTS 2,066,597  1/1937  West ..................................... 429/178
2,100,921 11/1937  Rolph .................................. 429/181
3,064,068 11/1962  Fouch .................................. 429/180
4,075,368  2/1978  Salamon et al. ................. 429/184 X

FOREIGN PATENT DOCUMENTS 7701558 11/1977 Sweden .
 585302  9/1977 United Kingdom .
1484835  9/1977 United Kingdom .

Primary Examiner—Anthony Skapars
Attorney, Agent, or Firm—Burns, Doane, Swecker & Mathis

[57] ABSTRACT

A pole bushing for batteries extends through the battery cover and forms a seal between the cover and the battery post. The bushing comprises a metal sleeve which is embedded in a sealing material to form a sealing element with an external surface which bears against the battery cover, and with an internal surface which at least partially is in close contact with the post passing through the cover. The metal sleeve is provided with grooves on its outside or inside to increase the sealing distance for contact between the sleeve and sealing material. One end portion of the sleeve extends out of the sealing material and forms an annular portion, the internal surface of which is for metallic connection to the post. The inventive sealing material is made of a resilient material, and the external surface of the sealing element is formed for contact with, and providing a sealing surface against the battery cover.

2 Claims, 3 Drawing Figures

POLE BUSHING FOR BATTERIES

BACKGROUND AND SUMMARY OF THE INVENTION

The present invention relates to a pole bushing for batteries, particularly of the kind leading through the battery cover and forming a seal between the cover and the battery post.

Such bushings comprise a metal sleeve which is provided with grooves and which is embedded in a sealing material to form a sealing element with an external surface which bears against the battery cover and with an internal surface which at least partially is in close and immovable contact with the post passing through the cover. One end portion of the metal sleeve extends out of the sealing material and forms an annular portion, the internal surface of which forms part of the internal surface of the sealing element and is meant to be at least partially in rigid metallic connection with the post.

A pole bushing for batteries of the kind mentioned above is previously known, for instance from SE-PA No. 7701558-4, and the object with this known device is to provide a pole bushing which can move axially together with the post and simultaneously provide an effective seal between the battery cover and the post. In structures known hitherto, the post, which is rigidly connected via a pole connection to the electrode plates, is also rigidly connected to the battery cover. However, the electrode plates expand due to ageing during operation, thus causing displacement of the post, which could damage the battery cover and result in leakage of the electrolyte. However, these drawbacks have been eliminated with a pole bushing which is displaceable in the cover and provided with means for ensuring a fluid-tight seal between the pole bushing and the cover.

However, the pole bushing according to the Swedish patent application mentioned above is burdened with certain drawbacks, since the material used in the sealing element will only permit an effective seal against the metallic sleeve but not against the battery cover. This means that either the pole bushing or the battery cover must be provided with a recess for a sealing ring made from a material capable of providing an effective seal between the cover and the bushing.

One object of the present invention is to provide a simple structure for a pole bushing by eliminating the recess and the sealing ring and nevertheless maintaining an effective seal between the cover and the bushing.

In accordance with the invention this object is realized by the sealing material having resilient properties and by the external surface of the sealing element being shaped for movable and sealing contact with the battery cover for forming a sealing surface against the cover.

In a suitable embodiment the sealing material is made of rubber, whereas the sleeve and the surface of the post are made of lead.

BRIEF DESCRIPTION OF THE DRAWINGS

The invention will best be understood from the following description of a suitable embodiment, when read in conjunction with the accompanying drawings on which.

DESCRIPTION OF THE PREFERRED EMBODIMENT

Figure 1:
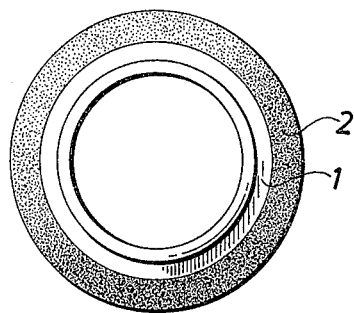
FIG. 1 is an end view of the pole bushing in accordance with the invention.
Figure 2:
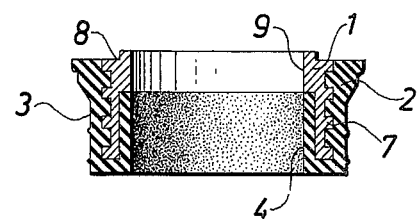
FIG. 2 is a cross sectional view of the pole bushing according to FIG. 1.
Figure 3:
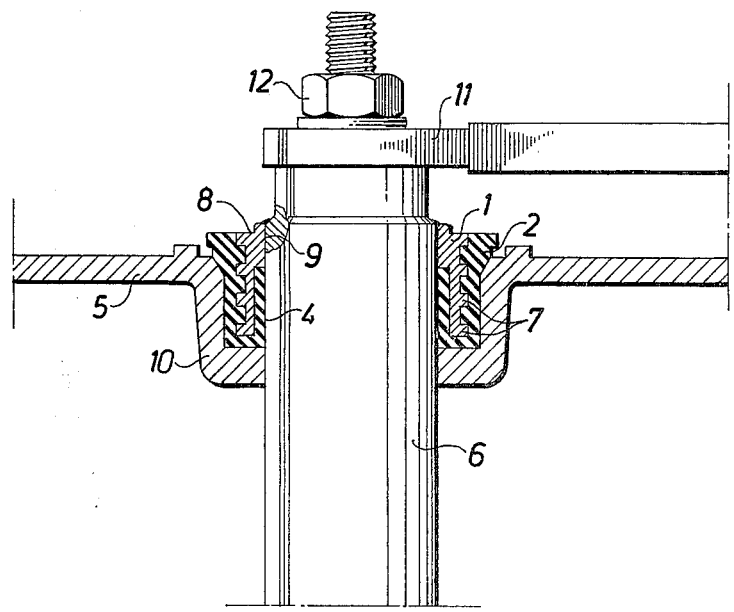
FIG. 3 is a cross-sectional view through a cover with a pole bushing according to FIGS. 1 and 2, the cover being metallically connected to a post.

The pole bushing shown in FIGS. 1 and 2 comprises a sleeve 1 of metal, which is embedded in a sealing material 2 to form a sealing element with external 3 and internal 4 surfaces for making direct contact with the battery cover 5 and a post 6 extending through the cover 5 (see FIG. 3). The metal sleeve 1 is suitably provided with grooves 7 or serrations to increase the sealing distance for contact between the metal sleeve 1 and the sealing material 2, thereby increasing the sealing effect and preventing electrolyte from leaking out between the sleeve and the sealing material. The upper end portion 8 of the sleeve extends out of the sealing material to form an annular portion with internal sealing surface 9, this surface forming part of the internal surface 4 of the sealing element and intended for rigid metallic connection to the post 6.

In accordance with the invention, the sealing material 2 is resilient and is provided with an external bearing surface 3 which is in movable and sealing contact with the battery cover 5. The resilient material 2 can also be treated so that it is given extremely good sealing properties against the metal sleeve 1. The material 2 preferably consists of rubber, while both metal sleeve 1 and the surface of the post 6 are usually made of lead.

The pole bushing according to FIGS. 1 and 2 is rigidly connected to the post 6, as shown in FIG. 3, by welding the interior sealing surface 9 of the annular portion 8 of the sleeve 1 against the post 6, which provides a completely liquid-tight metallic connection.

In accordance with the invention the sealing element and the post will form a rigid body which is movable relative to the cover when subject to electrochemical expansion during operation of the battery, whereas movements between the lead and the rubber are completely eliminated. This is contrary to the conventional application of rubber sealings in battery covers, where the post can move relative to the seal, and where the surface of the lead is exposed to corrosive attack from the electrolyte, signifying considerable risk of leakage between the post and the rubber seal. This risk is eliminated in the inventive bushing. The adherence between the rubber material and the lead sleeve can be considerably increased if the rubber is vulcanized before assembly with the sleeve, thereby enhancing the sealing properties.

The cover is usually made of plastics material and is provided with a seat 10, in which the sealing element is axially displaceable while maintaining a good seal between the cover 5 and the sealing material 2. A pole shoe 11 is connected to the external end of the post 6 by means of a nut 12. The inner portion of the post (not shown) is rigidly connected in a conventional manner to the electrode plates of the battery via a pole connection and when the sealing element has been welded to the post it will participate in the movements of the post. Since the bushing is axially displaceable in the battery cover it will not be subjected to harmful stresses or damage.

I claim:

1. A pole bushing for a lead acid battery of the type having a cover and a lead post connected to electrode plates and passing through the cover, said bushing comprising:

a lead sleeve provided with grooves and embedded in an elastic rubber sealing material to form therewith a sealing element having an extended sealing path therewithin;

one end of said sleeve projecting beyond the sealing material and being rigidly connected to said lead post so that said lead post and said sealing element are rigidly and immovably interconnected for common movement in the axial direction of said post;

said sealing element including:

an internal surface defined partially by said elastic rubber sealing material and partially by an internal surface of said one end of said lead sleeve, said internal surface of said sealing element being in close and immovable contact with the lead post; and an external surface slidingly bearing against the battery cover, permitting said sealing element and said post to move relative to the battery cover, said external surface of said sealing element being defined by said elastic rubber sealing material which constitutes the sole fluid seal between the cover and the sealing element.

2. The pole bushing recited in claim 1 wherein the elastic rubber sealing material is a pre-vulcanized material.

* * * * *